(12) United States Patent
Iyengar

(10) Patent No.: US 9,280,470 B2
(45) Date of Patent: *Mar. 8, 2016

(54) CACHE REPLACEMENT FOR SHARED MEMORY CACHES

(75) Inventor: Arun Iyengar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 400 days.

This patent is subject to a terminal disclaimer.

(21) Appl. No.: 13/617,477

(22) Filed: Sep. 14, 2012

(65) Prior Publication Data

US 2014/0025898 A1    Jan. 23, 2014

Related U.S. Application Data

(63) Continuation of application No. 13/554,562, filed on Jul. 20, 2012.

(51) Int. Cl.
*G06F 12/08* (2006.01)
*G06F 12/12* (2006.01)

(52) U.S. Cl.
CPC ............ *G06F 12/084* (2013.01); *G06F 12/121* (2013.01); *G06F 12/123* (2013.01); *G06F 2212/69* (2013.01)

(58) Field of Classification Search
CPC ... G06F 12/084; G06F 12/121; G06F 12/123; G06F 2212/69
USPC ........................... 711/130, 133, 134; 719/312
See application file for complete search history.

(56) References Cited

U.S. PATENT DOCUMENTS

| 5,077,658 | A | * | 12/1991 | Bendert et al. | |
|---|---|---|---|---|---|
| 6,115,802 | A | | 9/2000 | Tock et al. | |
| 6,266,742 | B1 | | 7/2001 | Challenger et al. | |
| 6,601,143 | B1 | | 7/2003 | Lamparter | |
| 6,772,291 | B2 | * | 8/2004 | Palanca et al. | 711/128 |
| 6,807,607 | B1 | | 10/2004 | Lamparter | |
| 6,823,511 | B1 | | 11/2004 | McKenney et al. | |

(Continued)

OTHER PUBLICATIONS

Li et al., "A Minimal Access Cost-Based Multimedia Object Replacement Algorithm", 2007, IEEE.

(Continued)

*Primary Examiner* — Reginald Bragdon
*Assistant Examiner* — Mehdi Namazi
(74) *Attorney, Agent, or Firm* — Fleit Gibbons Gutman Bongini & Bianco PL; Jose Gutman

(57) ABSTRACT

An information processing system and computer program storage product for managing objects stored in a shared memory cache. The system includes at least a plurality of cache readers accessing data from the shared memory cache. The system updates data in the shared memory cache using a cache writer. The system maintains a cache replacement process collocated with a cache writer. The cache replacement process makes a plurality of decisions on objects to store in the shared memory cache. Each of the plurality of cache readers maintains information on frequencies with which it accesses cached objects. Each of the plurality of cache readers communicates the maintained information to the cache replacement process. The cache replacement process uses the communicated information on frequencies to make at least one decision on replacing at least one object currently stored in the shared memory cache.

22 Claims, 8 Drawing Sheets

(56) References Cited

U.S. PATENT DOCUMENTS

| | | | |
|---|---|---|---|
| 6,851,034 | B2 | 2/2005 | Challenger et al. |
| 6,877,067 | B2 * | 4/2005 | Yamazaki ............... 711/128 |
| 6,970,981 | B2 | 11/2005 | Kanaley |
| 7,533,138 | B1 | 5/2009 | Martin |
| 7,668,851 | B2 | 2/2010 | Triplett |
| 7,844,779 | B2 * | 11/2010 | Kornegay et al. ......... 711/133 |
| 7,975,107 | B2 | 7/2011 | Beckmann et al. |
| 8,489,821 | B2 | 7/2013 | Dantzig et al. |
| 8,688,925 | B2 | 4/2014 | Lankreijer |
| 2008/0033952 | A1 | 2/2008 | McKenney et al. |
| 2009/0240894 | A1 | 9/2009 | George et al. |
| 2010/0023707 | A1 | 1/2010 | Hohmuth et al. |
| 2010/0275209 | A1 | 10/2010 | Detlefs |
| 2011/0022805 | A1 | 1/2011 | Schreter |
| 2011/0066808 | A1 * | 3/2011 | Flynn et al. .............. 711/118 |
| 2011/0138129 | A1 * | 6/2011 | Krishna et al. ........... 711/133 |
| 2011/0161585 | A1 | 6/2011 | Kottapalli et al. |
| 2012/0072686 | A1 | 3/2012 | Iyengar |
| 2012/0079212 | A1 * | 3/2012 | Dantzig et al. ........... 711/144 |

OTHER PUBLICATIONS

Iyengar, Arun, "Scalability of Dynamic Storage Allocation Algorithms", Proceedings of Frontiers, 1996.

Cao et al., "Cost-Aware WWW Proxy Caching Algorithms", Proceedings of the USENIX Symposium on Internet Technologies and Systems, Monterey, California, Dec. 1997.

IBM et al., "Read Many Write One Memory Mapped File", Jul. 2011.

shmget(2)—Linux man page, linux.die.net/man/2/shmget, Linux manual, Jun. 2012.

shmget—"Get an XSI shared memory segment", http://pubs.opengroup.org/onlinepubs/009695399/functions/shmget.html, The Open Group Base Specifications Issue 6, IEEE Std 1003.1, 2004 Edition.

"Linux / Unix Command: shmget", linux.about.com/library.cmd/blemdl2, Linux / Unix command library, Jun. 2012.

Non-Final Rejection dated Jan. 28, 2015 received for U.S. Appl. No. 13/554,562.

Non-Final Rejection dated Mar. 17, 2014 received for U.S. Appl. No. 13/554,562.

Michael, M., "High Preformance Dynamic Lock-Free Hash Tables and List-Based Sets," SPAA, Aug. 10-13, 2002, pp. 1-10.

Valois, J., "Lock-Free Linked Lists Using Compare and Swap," In Symposium on Principles of Distributed Computing, Aug. 1995, pp. 214-222.

Michael, M., "Safe Memory Reclamation for Dynamic Lock-Free Objects Using Atomic Reads and Writes," PODC, Jul. 21-24 2002, pp. 1-10.

Herlihy, M., et al., "Transactional Memory: Architectural Support for Lock-Free Data Structures," 20th International Symposium in Computer Architecture, May 20, 1993, pp. 1-12.

Barnes, G., "A Method for Implementing Lock-Free Shared Data Structures," Fifth annual ACM symposium on Parallel algorithms and architectures, Jul. 1993, pp. 1-10.

Non Final Office Action dated Mar. 27, 2013, received for U.S. Appl. No. 12/888,883.

Non Final Office Action dated Aug. 21, 2013, received for U.S. Appl. No. 13/925,356.

Notice of Allowance dated May 21, 2014 received for U.S. Appl. No. 14/227,398.

Final Office Action dated Jul. 14, 2015 received for U.S. Appl. No. 13/554,562.

* cited by examiner

CACHE REPLACEMENT FOR SHARED MEMORY CACHES

CROSS-REFERENCE TO RELATED APPLICATION

This application is a continuation of and claims priority from U.S. patent application Ser. No. 13/554,562 filed on Jul. 20, 2012, the disclosure of which is hereby incorporated by reference in its entirety.

BACKGROUND

The present disclosure generally relates to computer memory management, and more particularly relates to cache memory management.

Memory management, and particularly caching, is used to improve performance in a wide variety of computer systems. The basic idea of caching is to replicate data in a cache memory that is close to a client processor so that the client does not have to fetch cached data objects from, or store cached data objects to, a remote memory location, such as from-to a separate processing node in a multiprocessor computer system, or from-to a persistent storage memory, or the like, for which the overhead cost to access, or to store, the data would be high.

In some computer systems, cache memory is shared between two or more processes. Shared memory caches often are not large enough to store all of the data that would benefit from caching. Determining what data should be stored in the shared cache memory and what data should be removed from the shared cache memory (also referred to as cache replacement), have not been considered in this type of shared cache memory context. For example, when a data object is needed by a process running on a processor during intensive processing, if the data object is not available in local cache memory it creates inefficiency in trying to access the data object from a remote memory location. As this type of shared cache memory management becomes prevalent in modern computer system designs it will create an increasing problem to maintain and improve overall performance efficiency.

BRIEF SUMMARY

In one embodiment, a computer program storage product for managing objects stored in a shared memory cache is disclosed. The computer program storage product comprises instructions to perform a method that accesses data from the shared memory cache using at least a plurality of cache readers. An information processing system updates data in the shared memory cache using a single cache writer. The system maintains a cache replacement process collocated with a cache writer. The cache replacement process makes a plurality of decisions on objects to store in the shared memory cache. Each of the plurality of cache readers maintains information on frequencies with which it accesses cached objects. Each of the plurality of cache readers communicates the maintained information to the cache replacement process. The cache replacement process uses the communicated information on frequencies to make at least one decision on replacing at least one object currently stored in the shared memory cache.

In another embodiment, an information processing system comprises a shared memory cache for storing data. At least one processor is communicatively coupled with the shared memory cache. The at least one processor is configured with computer instructions. A single writer cache is communicatively coupled with the at least one processor, for updating, with the at least one processor, data stored in the shared memory. A cache replacement process is collocated with the single writer cache and communicatively coupled with the at least one processor. The cache replacement process makes, with the at least one processor, a plurality of decisions on objects to store in the shared memory cache based at least on information regarding data access frequencies received from reader caches. A plurality of reader caches access data stored in the shared memory cache and communicate the information regarding data access frequencies to the cache replacement process.

BRIEF DESCRIPTION OF THE SEVERAL VIEWS OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
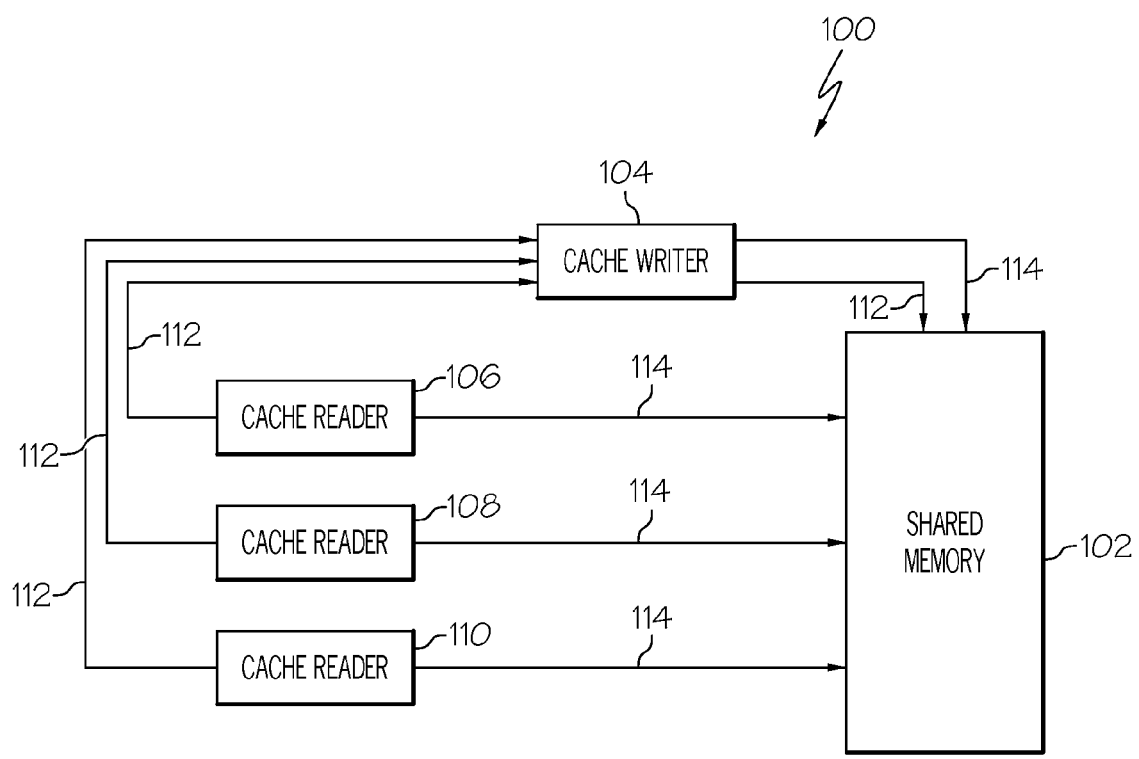
FIG. 1 is a block diagram illustrating one example of a cache architecture and operating environment according to one embodiment of the present invention.

According to various embodiments of the present invention the problem of cache replacement for shared memory caches is effectively addressed thereby increasing overall performance efficiency for a computer system. While caches are often not large enough to store all of the data content that would benefit from caching, systems and methods hereby provided determine what data should be stored in the cache and what data should be removed from the cache. Conventional computer systems utilizing cache replacement mechanism have not considered how to handle cache replacement in shared memory cache designs. The following discussion will describe the general mechanism of cache memory management and particularly in a shared cache memory design. Thereafter, a discussion of various embodiments according to the present invention discloses novel solutions to the problems of memory management and particularly to shared memory cache replacement.

Data associated with a computer application, for example, can be stored in a cache so that the data can be accessed quickly. Consider an application involving multiple processes executing in the same node. A key problem is for multiple processes p1, p2, ..., pn executing in the same node to be able to access the same data.

One solution is for each process to have its own cache. For n processes, there would be n caches, one for each process. This means that there could potentially be n copies of a cached data object. This space overhead is a significant drawback. Another problem is that with multiple copies, consistency among the multiple copies needs to be maintained. This adds further complications and overhead.

Another solution is to have a cache process c1 communicating with p1, p2, . . . , pn. A process pi would access the cache by communicating with c1. This interprocess communication incurs overhead.

There is a need for the memory management and particularly shared memory caching solutions provided in the present disclosure, which alleviate the inefficiencies and drawbacks of conventional computer systems and methods utilizing cache memory management.

According to various embodiments of the present invention, cache replacement for a shared memory cache is provided. It is particularly applicable to situations in which multiple processes running on the same node access a single cache stored in shared memory accessible to all of the processes running on the node. This avoids the drawbacks of maintaining multiple copies of the same cached objects. It also avoids the overhead of requiring interprocess communication for any one of the multiple processes running on the same node to obtain data from the cache.

Below will be described one example of architecture and operating environment for a shared memory cache which can utilize various embodiments of the present invention. Note that other caches with shared memory architectures can utilize one or more embodiments according to the present invention as well.

The cache is maintained in shared memory. That way, any process (running on the same node as the cache) that needs to access the cache can simply access the shared memory location(s) of the cache storing the data being accessed.

FIG. 1 shows one example of cache architecture 100 according to various embodiments of the present invention. Cached data objects are stored in location(s) of the shared memory 102. Throughout this discussion, the terms "object" or "data object" refer to an entity which can be stored in a cache. According to the present example, one cache writer 104 performs updates to the shared memory 102 of the cache 100. One or more cache readers 106, 108, 110, can directly access the shared memory 102 of the cache 100 to read cached data. In order to update cached data in the shared memory 102, however, a cache reader 106, 108, 110 needs to contact the cache writer 104 to perform the update.

In FIG. 1, the write arrows 112 represent cache write requests. The read arrows 114 represent read requests. Throughout this discussion, the terms "write arrows" and "write requests" are synonymous. Similarly, the terms "read arrows" and "read requests" are synonymous. Note how read requests 114 can go directly from a cache reader 106, 108, 110, to shared memory 102. Write requests 112 from a cache reader 106, 108, 110, however, need to go to the cache writer 104 which then makes write request 112 to the shared memory 102.

The fact that a cache reader 106, 108, 110, can directly access shared memory 102 for read requests 114 results in good performance for the cache architecture 100. The fact that all updates (write requests 112) go through the cache writer 104 controls updates so that they are made in a consistent fashion.

Caches 100 typically contain cache directories (not shown in FIG. 1) which allow cache objects to be located in the cache 100. Usually, the directory will use a key to identify the location where cached data is stored in the shared memory 102. The key typically could be any concatenated data elements, such as a text string, a byte stream, or the like. A wide variety of implementations could be used for maintaining a cache directory. According to one example embodiment, hash tables can be used for managing cache directories. However, many other types of data structures could be used within the spirit and scope of the present invention, including, but not limited to, balanced trees, lists, and the like.

A cache directory, according to the present example, is maintained in shared memory 102. The memory for storing cache keys and cache data is also maintained in shared memory 102. A memory allocator is used for managing the space within shared memory 102. The memory allocator is both fast and uses memory space efficiently (without wasting much memory).

Figure 2:
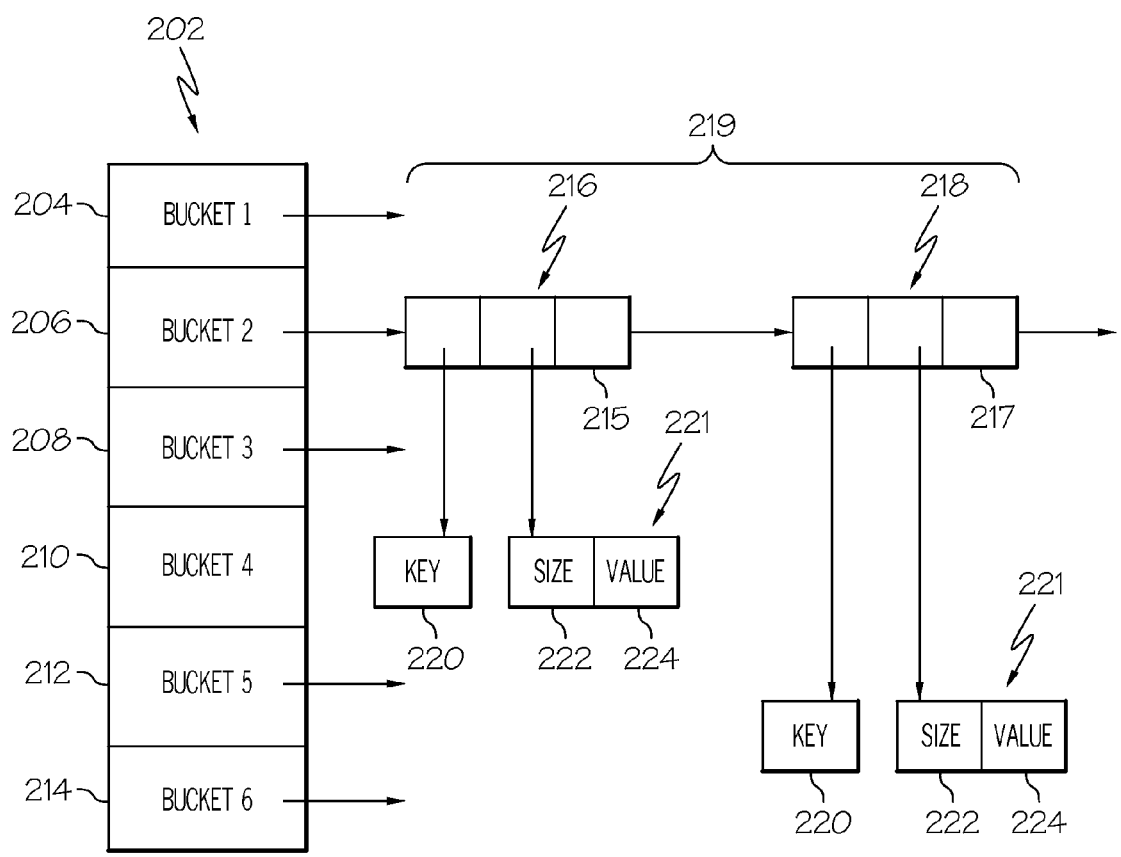
FIG. 2 is a block diagram showing an example data structure for managing a cache memory of the cache architecture illustrated in FIG. 1.

FIG. 2 shows one example implementation of data structures for managing cache directories, in accordance with various embodiments of the present invention. Note that other data structures are also possible within the spirit and scope of the present invention. One possible implementation is to implement shared memory using shared memory segments (also referred to as shared segments—such as POSIX shared segments) which uses the well-known Unix function calls shmget and shmat (see for example the references below discussing open standard operating system environments):

http://linux.about.com/library/cmd/blcmd12_shmget.htm
http://linux.die.net/man/2/shmget
http://www.opengroup.org/onlinepubs/009695399/functions/shmget.html When this type of data structure is implemented, references to objects within a shared segment should preferably be relative addresses (i.e., an offset added to a base). That way, the references will be calculated correctly regardless of where the system attaches a shared memory segment within the address space of a process. The base for calculating relative addresses would depend on where the shared segment is attached within the address space of a process.

FIG. 2 shows the hash table 202 stored within shared memory 102. Addresses within this hash table 202 are given as an offset relative to a base (i.e., relative addresses). Absolute addresses are determined by adding the offset to a base. Hash tables, according to the present example, are comprised of a plurality of buckets 204, 206, 208, 210, 212, 214, such as shown in FIG. 2. A bucket stores 0 or more cached objects. If there are multiple cached objects within a bucket, which is the case for bucket two 206, the multiple objects 216, 218, may be stored using a linked list 219. Note, in the current example, that bucket two's linked list 219 has a pointer at the beginning 206 which points to the first object 216. Next, the first object 216 has a pointer 215 which points to the second object 218. Then, the second object 218 (which is last in the list 219) has a pointer 217 that points back to the beginning 206 of the linked list 219. In FIG. 2, the data corresponding to a cached object includes a first data structure including its key 220, and a second data structure 201 including the size 222 of the data and the data 224 itself. The memory for storing these various items is efficiently managed by a memory allocator.

One of the main issues in designing this type of cache architecture 100 is how to prevent parallel updates from creating inconsistent versions of cached data. This is partly solved by requiring all updates to go through the cache writer 104; a cache reader 106, 108, 110, is not allowed to update cached data without going through the cache writer 104 (i.e., see write requests 112 in FIG. 1). Furthermore, the cache writer 104 could be implemented as a single process using techniques such as mutexes, semaphores, and/or the like, to prevent concurrent updates to the same cached objects from taking place.

However, there could still be a problem if a cache writer 104 would update a part of the cache memory 102 that a cache reader 106, 108, 110, is trying to access. The problem is that the cache writer 104 might be updating a part of the cache memory 102 that a reader is contemporaneously trying to read. This could result in the cache reader 106, 108, 110, seeing inconsistent results. A discussion of solutions for handling this type of problem follows below.

One approach is to use locks. If a process has an exclusive lock on an object, it knows that no other process is currently reading the object or attempting to update the object. The process can thus go ahead and perform the update knowing that it will not adversely affect other processes.

One problem with using many locks is that they incur significant overhead. If many exclusive locks are being obtained, this can significantly reduce the number of cache operations that can take place at a time, seriously reducing performance. Another problem is that the lock mechanism itself has significant overhead. In many cases, it may be desirable to limit the number of locks due to the overhead that each lock imposes on the system. There may be a maximum number of locks that a system will allow. Yet another drawback to using locks is that the system can become deadlocked and stop operating if the locking protocol is not robustly and adequately designed.

Provided below are solutions for alleviating the possible problems caused by using locks. One solution achieves updates to the cache 100 without requiring the use of locks. A second solution allows a limited number of locks to be used so that system overhead due to using a high number of locks is not incurred.

Described below will be solutions for updating the cache 100 consistently without requiring the use of locks.

Add an Object

Figure 3:
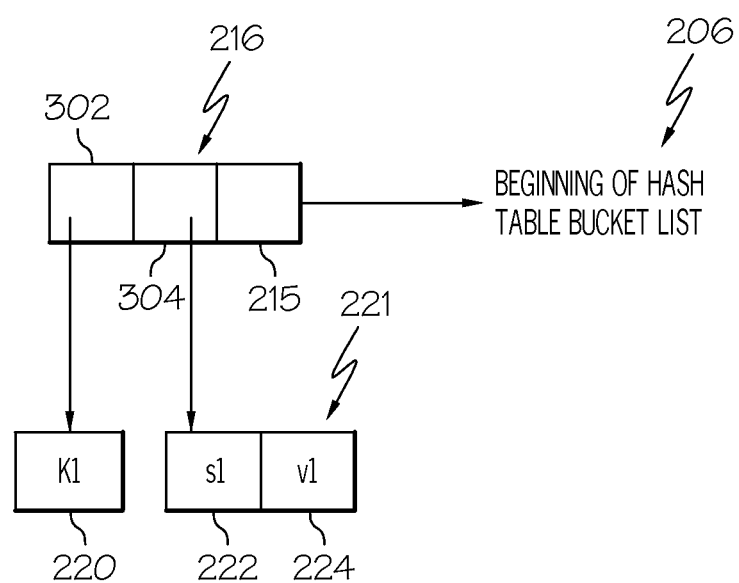
FIGS. 3 and 4 are block diagrams further illustrating example data structures for managing a cache memory of the cache architecture illustrated in FIG. 1.

Considering FIGS. 2 and 3, suppose that a computer system cache writer 104 wants to add a new object of to the cache 100. The correct bucket (e.g., bucket 206) for the object o1 needs to be determined. Hash table buckets 204, 206, 208, 210, 212, 214, are comprised of linked lists (e.g., see linked list 219) which point to the keys 220, and values 221 (e.g., size/value pairs 222, 224), of objects in each bucket 204, 206, 208, 210, 212, 214. A new list item 216 (also referred to as an element in the list) is created for the new object o1, as shown in FIG. 3. The new list item 216 (i.e., representing the new object o1), according to the present example, includes a first pointer 302 pointing to a first data structure containing the key 220 and a second pointer 304 pointing to a second data structure 221 containing the size 222 and the value 224 (e.g., a size/value pair) of the data for the new object o1. The cache writer 104 creates and initializes these data structures 216, 220, 221, without locking them. While the cache writer 104 is doing so, none of the cache readers 106, 108, 110, have access to these data structures 216, 220, 221, for the new object o1. There is thus no need for the cache writer 104 to lock these data structures 216, 220, 221, during this process of creating and initializing the new object o1 to add it to the cache 100.

The new information for of will be placed at the beginning of the linked list 219 corresponding to the determined hash table bucket 206 for the new object o1. Accordingly, the new list item 216 includes a next item pointer 306 that is initially set to point to the beginning of the current hash table bucket list 206, as shown in FIG. 3. Note that the data structures 216, 220, 221, for the new object o1 are not yet accessible from the hash table 202.

Figure 4:
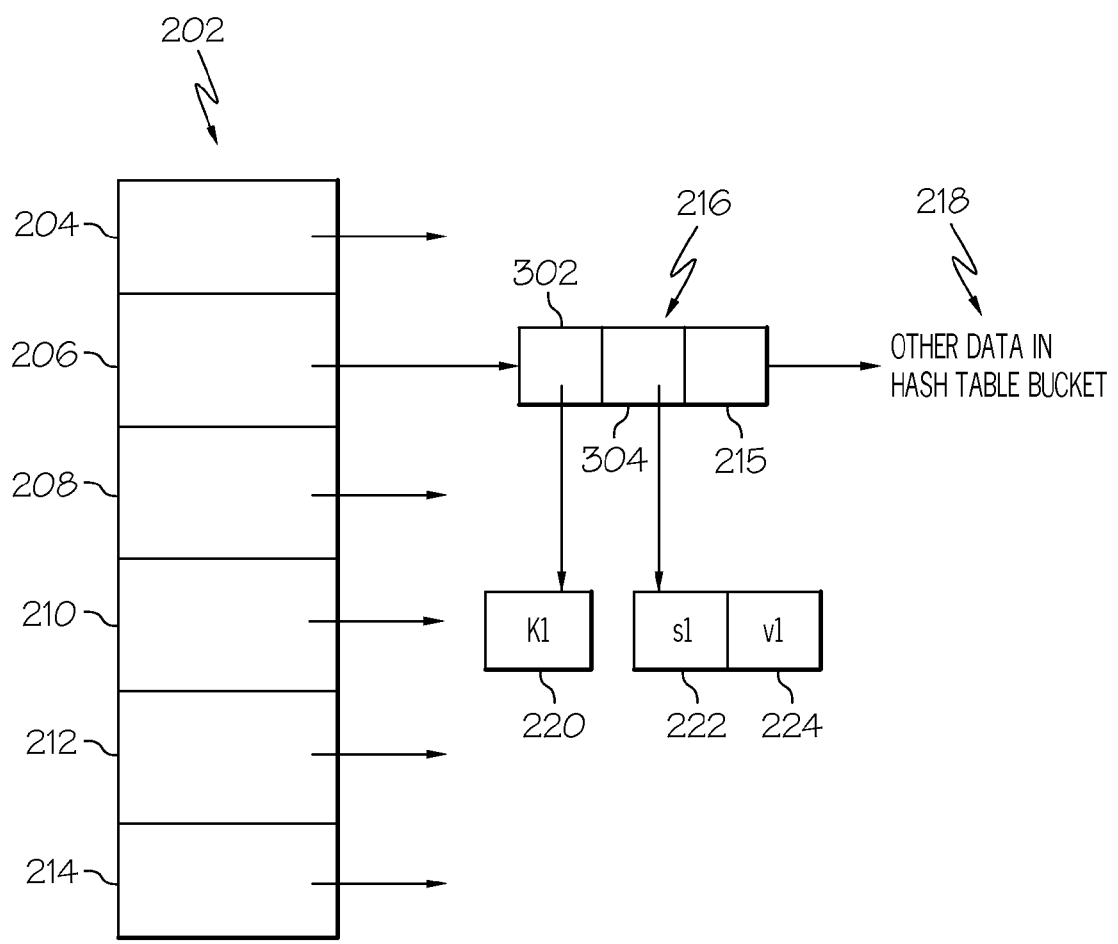

Next, the new data structures 216, 220, 221, for the new object o1 are made accessible from the hash table 202 by storing the memory address of the list item 216 as the new first element in the hash table bucket 206, as shown in FIG. 4. Object o1 is now accessible by cache readers 106, 108, 110, which can read the hash table 202 and thereby find the memory address of the particular list item 216 representing the newly added object o1. The process of storing the data structure 216, 220, 221, for the new object o1 as the new head 206 of the hash table bucket linked list 219, should be performed atomically. That way, a cache reader 106, 108, 110, will not see an intermediate version of a pointer update which contains inconsistent information.

It should be noted that a second object o2 can be similarly added to the end of the hash table bucket linked list 219, such as illustrated with the list item 218 representing the newly added second object o2 (see FIG. 2). The process of storing the data structures 218, 220, 221, for the new second object o2 should be performed atomically. The next item pointer 306 of the first list item 216 is set to point to the second list item 218. The second list item 218, similar to the first list item 216, includes a next item pointer. The second list item 218 being at the end of the list 219, its next item pointer is set to point to the beginning of the current hash table bucket list 206. The hash table bucket linked list 219, according to the present example, comprises a circular linked list with pointers in each list item 216, 218, that allow traversing the linked list 219 from the beginning of the current hash table bucket list 206, to the first list item 216, and therefrom to the second list item 218, and finally therefrom back to the beginning of the current hash table bucket list 206.

Change an Object

Another type of update operation that the system might need to perform is to change the value of an object associated with a key k1 220. In order to do this, the cache writer 104 performs an atomic update of the size and value fields 222, 224, for the object corresponding to k1 220. One method for atomically updating the size and value 222, 224, of the object corresponding to k1 220 is to create a new data structure 221 containing the new size 222 and value 224 pair (Note in FIG. 3, for example referring to the first list item 216, how the size 222 and value 224 are stored in a single data structure 221 with a pointer 304 to the data structure 221). The new size 222 and value 224 are not accessible to cache readers 106, 108, 110, until a pointer 304 to the data structure 221 from the list item 216 data structure corresponding to k1 220 is atomically updated to point to the new size/value data structure 221 corresponding to the key k1 220.

Thus, atomic updates of pointers 206, 302, 304, 215, such as illustrated in FIGS. 2 and 3, allow various embodiments of the present invention to achieve consistent updates of data structures 220, 221, without requiring locks.

It may be desirable to keep the old size/value pair around after the update has taken place. This would be true if one or more existing processes have pointers to the old value. After it is determined that these processes have either terminated and/or no longer need access to the old value, memory space for the old data can be reclaimed such as by a cache memory manager process (e.g., a memory garbage collection process).

Delete an Object

Another type of update operation that the system might require is to delete an object from the cache 100. The cache writer 104 deletes a cached object, for example object o1 represented by the first list item 216 in the linked list 219, with key k1 220 by finding the list item l1 216 corresponding to k1 220 (which contains respective pointers 302, 304 to the data structure 220 for k1 as well as to the data structure 221 containing the size/value 222, 224, for the first object o1). The first list item l1 216 is removed from the hash table bucket list by atomically modifying a pointer. More specifically, in this example, the pointer 206 (which is at the beginning of the list 219) that points to the first list item l1 216 in the linked list 219 is atomically modified to point to the element (e.g., the second list item l2 218) sequentially after the first list l1 216. If l1 216 is the only item in the linked list 219 the pointer 206 at the beginning of the list 219 would be set to point to null (since no more elements remain in the list 219).

It should be noted that similar mechanisms would be used for deleting the second list item l2 218 from a linked list 219 that initially includes both l1 216 and l2 218. In this case, the next item pointer 306 of l1 216 would be updated to point back to the beginning of the hash table bucket list 206. This immediately deletes the second list item l2 218 from the linked list 219.

The deleted object's respective data structures 220, 221, containing k1 and the size/value of the data associated with k1 may be subsequently reclaimed. It may be desirable to keep one or more of these data structures 220, 221, available in memory after the cached object has been removed (deleted) from the hash table 202. This would be true if one or more existing processes have pointers to the old data value (and/or to the old key). After it is determined that these processes have either terminated and/or no longer need access to any of the old data structures 220, 221, memory space for the old data structures 220, 221, can be reclaimed.

All of the cache readers 106, 108, 110, and the cache writer 104, look up values corresponding to keys 220 by searching the hash table 202. Cache readers 106, 108, 110, (as well as the cache writer 104) have the ability to read the hash table 202. Using the lock-free mechanisms described above, locks are not required to read from the cache 100 or to update the cache 100.

If an information processing system does not have the ability to atomically update memory locations such as by updating pointers as discussed above, it may be necessary to use at least some locking mechanisms to avoid inconsistencies in accessing and updating memory. One option is to use a single global lock which locks the entire cache 100. Any process which wants to read from, or write to, the shared memory cache 100 must obtain a global lock. Only one process is allowed to access the global lock at a time. This solution will reduce concurrency too much because only a single process can access the cache at a time. This solution is thus often unacceptable.

A better solution is to use multiple locks which have finer granularity. For example, each hash table bucket 204, 206, 208, 210, 212, 214, could have a lock. Each process that wants to read from, or write to, the cache 100 must obtain a lock on the appropriate hash table bucket before it can do so. A potential problem with this solution is that when the number of hash table buckets is large, the number of locks becomes large as well. Locks can consume significant system resources. Furthermore, the system might allow only a limited number of locks. Having a lock for each hash table 202 might consume too many system resources and/or result in too much overhead.

Discussed below will be a solution for getting around the above-mentioned problems. Let num_locks be the maximum number of locks that the system can efficiently support for locking the hash table 202. If num_locks is greater than or equal to the number of hash table buckets, then a separate lock is assigned to each bucket of the hash table 202. A process needs to obtain the lock on a hash table bucket before it can search the list corresponding to the bucket to read or write to the cache.

If num_locks is less than the number of hash table buckets (a quantity which is subsequently also referred to as hash_table_size), then a single lock might have to be assigned to multiple hash table buckets. The following described approaches can be used for sharing locks among hash table buckets.

Simple assignment: The system assigns a lock to every hash_table_size/num_locks buckets (this number has to be rounded to an integer). In that way, each lock is assigned to the same number of buckets (modulo difference of 1 due to rounding errors)

Adaptive assignment: The system profiles how frequently different hash table buckets are accessed. This may vary over time. Based on this information, the system adaptively varies the assignment of locks to hash table buckets. The initial assignment could be (but does not have to be) the simple assignment scheme mentioned above.

A key aspect of adaptive assignment is to balance workload among different locks. If the system has some locks for which requests are almost always being held and requests are backed up waiting for the locks, while other locks are mostly free, this is not a good situation. If lock usage and lock waiting times are roughly similar across all locks, it is a preferable situation.

Adaptive assignment relies on collecting statistics for hash table buckets on how frequently they are each searched. This can be done in the following ways.

For a hash table bucket, count the number of times it is accessed over a time interval. The time interval can be varied.

For a hash table bucket, count the total amount of time it is being accessed over a time interval. The time interval can be varied. This approach usually results in better balancing of locks than the first approach mentioned above, but may require more work to implement properly.

Other approaches for determining how frequently hash table buckets are searched can be used within the spirit and scope of the present invention.

Using the statistics collected from the hash table buckets, the system determines the expected percentage of time each lock is likely to be held (which would be the sum of the times from each bucket assigned to the lock). If the expected lock holding times are similar for the locks, then this constitutes a good assignment of locks to buckets.

On the other hand, if, for example, there is a lock l1 for which the expected percentage of time for which it would be held (p1) is significantly higher than the expected percentage of time (p2) for which another lock l2 would be held, then one or more of the buckets currently assigned to lock l1 should be reassigned to l2 in order to balance locking holding times more evenly among l1 and l2. For example, there could be a threshold t1. When p1 exceeds p2 by at least the threshold amount, then the system would transfer one or more hash table buckets from l1 to l2.

Another method would be to estimate expected lock wait times (instead of percentage of times locks are expected to be held). In other words, for a lock l1, the system estimates the expected time that a process attempting to obtain l1 would have to wait. Let wt1 be the expected time that a process would have to wait to obtain a lock on l1. Let wt2 be the expected time that a process would have to wait to obtain a lock on another lock l2. If wt1 is significantly higher than wt2, then it would be desirable to assign one or more buckets currently assigned to l1 to l2 instead. For example, there could be a threshold t2. When wt1 exceeds wt2 by at least t2, the system would transfer one or more hash table buckets from t1 to t2.

Note that this approach of assigning locks to part of a data structure can be applied to other resources as well, not just to hash tables. The approaches described above are generally applicable to distributing requests evenly to a plurality of locks when each lock is managing part of a resource. The basic principle is to modify assignments of parts of the resource to locks in order to balance requests to the locks. The resource could be a data structure. Explained in detail above was how various embodiments of the present invention can be applied to a hash table. It would be straightforward for one of ordinary skill in the art to apply the inventive concepts described here to other data structures in a system.

There are several implementations of locks which are commonly used. These include but are not limited to semaphores and mutexes.

Below will be described how a system, according to various embodiments of the present invention, can handle cache replacement in shared memory caches. One or more embodiments of the present invention can be implemented in accordance with the shared memory cache system which has just been described in detail above. Alternatively, certain embodiments can be implemented in accordance with other shared memory caches as well.

Figure 5:
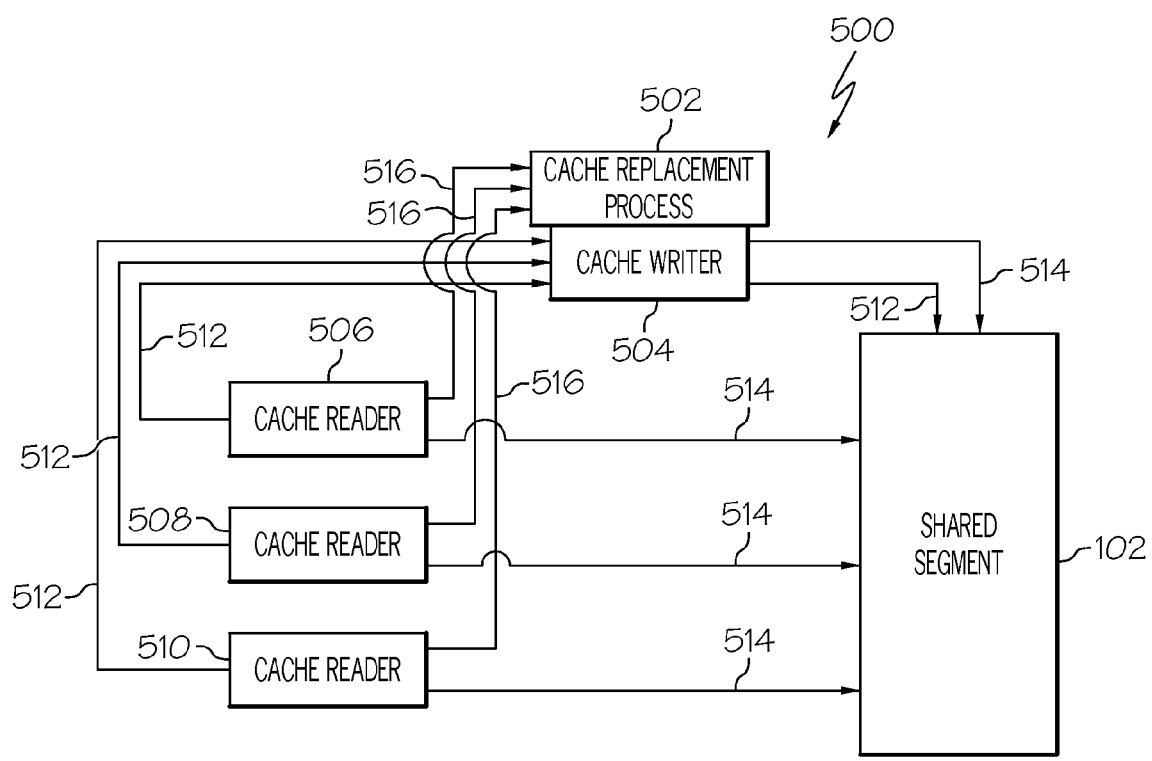
FIG. 5 is a block diagram illustrating another example of a cache architecture and operating environment according to an embodiment of the present invention.

FIG. 5 shows an example of cache architecture in accordance with various embodiments of the present invention. The cache 500 in FIG. 5 contains enhancements over the cache 100 in FIG. 1, for handling cache replacement, as will be discussed below. The arrows labeled 512 represent cache write requests. The arrows labeled 514 represent cache read requests. The arrows labeled 516 represent statistics information on cache accesses, the information being communicated from reader caches 506, 508, 510 to the cache replacement process 502. Similar to the cache architecture 100 of FIG. 1, the example cache 500 of FIG. 5 limits cache write requests 512 made from the cache readers 506, 508, 510, to be made to the single cache writer 504 which makes write requests 512 directly to the shared memory 102. Cache read requests 514, on the other hand, can be made directly from any of the cache readers 506, 508, 520, or from the cache writer 504, to the shared memory 102. Note also that in the current example the shared memory 102 comprises a shared memory segment as shown in FIG. 5. Shared memory segments have already been discussed above.

A main component in FIG. 5 is the cache replacement process 502 associated with the cache writer 504. According to one embodiment, the cache replacement process 502 is collocated with the cache writer 504. The cache replacement process 502 maintains statistics on how frequently objects are accessed in the cache 500. A main aspect of the present example is that there is a cache replacement process 502 keeping track of cache replacement statistics for the cache 500. The complication that a shared memory 102 architecture (e.g., the shared memory segment 102 architecture shown in FIG. 5) introduces is that there are multiple cache readers 506, 508, 510. If each cache reader 506, 508, 510, simply maintained its own statistics on access to the shared memory cache 500 that it makes, then there would not be a unified view of cache replacement statistics. Therefore, it would not be possible to make optimal cache replacement decisions for the cache 500.

By contrast, in accordance with the present discussion regarding the example cache 500 architecture of FIG. 5, the cache replacement process 502 maintains the necessary information to make cache replacement decisions for the cache 500.

The cache replacement process 502, in the present example, is on (or closely coupled with) the cache writer 504 as illustrated in FIG. 5. That is, the cache replacement process 502 is collocated with the cache writer 504. A variation in implementation, within the spirit and scope of various embodiments of the present invention, locates the cache replacement process 502 independently from (or possibly loosely coupled with) the cache writer 504. Another variation, according to various embodiments of the present invention, utilizes more than one computing process for handling cache replacement. In other words, the entity that is designated in FIG. 5 as a "cache replacement process" 502 can comprise a software module (or several software modules) implemented using one or more computing processes.

A specific cache reader (for example, the first cache reader r1 506) keeps track of accesses to cached objects that it makes. Periodically, according to the present example, the first cache reader r1 506 communicates 516 with the cache replacement process 502 to provide to the cache replacement process 502 updated statistics on cache accesses by the first cache reader r1 506. Using this approach, the cache replacement process 502 periodically receives updated information on accesses to cached objects from the first cache reader r1 506, and from other cache readers 508, 510. In the example shown in FIG. 5, the arrows 516 from the respective cache readers 506, 508, 510, to the cache replacement process 502 represent communications including information 516 sent from the cache readers 506, 508, 510, to the cache replacement process 502. These communications include information 516 on cache accesses by the respective individual cache readers 506, 508, 510. The cache replacement process 502 aggregates the information 516 on cache accesses from the first cache reader r1 506 and from the other cache readers 508, 510, so that the cache replacement process 502 has unified statistics on accesses to cached objects, such as by the cache readers 506, 508, 510. The cache replacement process 502 uses the statistics it has collected on accesses to cached objects to make decisions on which objects to keep in the shared memory cache 102 when the shared memory cache 102 becomes full and does not have sufficient space to store all objects. The cache replacement process 502 may also use these statistics to prefetch objects into the shared memory cache 102 before the objects are accessed by any of the cache readers 506, 508, 510, or by the cache writer 504.

Examples of information 516 which might be sent from a cache reader 506, 508, 510, to the cache replacement process 502 include, but are not limited to, the following.

Object o1 was accessed at time t1.

Object o2 was accessed 3 times between time t2 and t3.

Object o3 was accessed at times t4, t5, and t6.

One variant of the method used by the cache replacement process 502 discussed above, which is within the spirit and scope of the present invention, is to give extra weight (i.e., more importance) to certain cache readers 506, 508, 510. A first cache reader r1 506, for example, might be more important than other cache readers r2 508, r3 510, . . . , etc. In this case, continuing with the example, the cache replacement process 502 would assign a higher weight (i.e., more importance) to accesses to an object made by the first cache reader r1 506 than accesses to an object made by other cache readers 508, 510.

For example, suppose that the first cache reader r1 506 accesses a certain object o1 five times within the last minute. A second cache reader r2 508 accesses object o2 five times within the last minute. There is only space in the shared memory cache 102 to store one of the two objects. Even though the two objects o1 and o2 have been accessed with equal frequency, the first object o1 is given preference to remain in cache memory 102 because object o1 was accessed by the first cache reader r1 506 which is considered to be more important than the second cache reader r2 508. Therefore, the first object o1 remains in the cache memory 102, while the second object o2 is removed from the cache memory 102.

As another example, it is possible to assign a quantitative utility metric value, u, indicating how useful it is to cache an object. Individual cache readers 506, 508, 510, may have weights (i.e., levels of importance) assigned to them indicating how relatively important each is (i.e., relative to the other cache readers). More important cache readers have higher weights. To determine the utility metric value assigned to a cached object, the cache replacement process 502 weighs accesses to each cached object by the weight of, for example, the individual cache reader which accesses the cached object. For example, suppose that the first cache reader r1 506 has a weight of 2 and the second cache reader r2 508 has a weight of 1. Then each access of an object by the first cache reader r1 506 would add 2 to the utility metric value for the object. By contrast, each access of an object by the second cache reader r2 508 would only add 1 to the utility metric value for the object. The cache replacement process 502 attempts to keep objects in the cache segment memory with higher utility values.

Cache readers 506, 508, 510, periodically communicate with and update the cache replacement process 502 with new information 516 on accesses to cached objects. If this information 516 is updated very frequently, the cache replacement process 502 will have very current information and can make accurate cache replacement decisions. On the negative side, sending information 516 too frequently can incur overhead. In order to minimize overhead, open connections can be maintained between a cache reader 506, 508, 510, and a cache replacement process 502. Multiple communications between a cache reader 506, 508, 510, and a cache replacement process 502 can be made on a single connection.

If a cache reader 506, 508, 510, updates a cache replacement process 502 infrequently, less overhead will be incurred. On the negative side, the cache replacement process 502 will have less current information which may result in suboptimal cache replacement decisions. Thus, frequency of communication between a cache reader 506, 508, 510, and a cache replacement process 502 should be selected to balance currency of information known by the cache replacement process 502 and overhead resulting from communications of information 516.

There are multiple options for selecting a frequency with which a cache reader 506, 508, 510, communicates with a cache replacement process 502 including but not limited to the following.

A cache reader 506, 508, 510, sends updated information 516 on accesses to cached objects after a certain time period has elapsed.

A cache reader 506, 508, 510, sends updated information 516 on accesses to cached objects after a certain number of cache reads have taken place. It is possible for a cache reader 506, 508, 510, to send updated information 516 after every single cache read. The drawback to this approach is the overhead which might occur.

A cache reader 506, 508, 510, can maintain information on access patterns, e.g., patterns of read requests. Over time, these patterns may change. For example, object o1 might be accessed on average once every minute. At some point, object o1 might start being accessed much more frequently (e.g. once every 5 seconds). When this change in access patterns occurs, the cache reader 506, 508, 510, sends information about the change in access patterns to the cache replacement process 502. As another example, a threshold t1 could be maintained representing a frequency of access to an object o1 (e.g. 5 accesses per minute). The cache replacement process 502 is aware (although its information may be out of date) of whether the frequency of accesses to object o1 from a cache reader, for example the first cache reader r1 506, is above or below the threshold t1. If an access frequency to object o1 from the first cache reader r1 506 were previously below t1 but then increases above t1, the first cache reader r1 506 notifies the cache replacement process 502 of the new access frequency for object o1. Similarly, if an access frequency to object o1 from the first cache reader r1 506 were previously above t1 but then falls below t1, the cache reader r1 506 notifies the cache replacement process 502 of the new access frequency for object o1.

Yet another feature of various embodiments of the present invention is the ability to dynamically tune the frequency with which each cache reader 506, 508, 510, and optionally the cache writer 504, communicates information 516 with the cache replacement process 502 in order to optimize performance. When available bandwidth for communication of information 516, such as between cache readers 506, 508, 510, and a cache replacement process 502 is low, it is preferable to limit (and/or decrease the frequency of sending) communication of information 516 between the cache readers and the cache replacement process. When available bandwidth for communication of information 516 such as between cache readers 506, 508, 510, and a cache replacement process 502 is high (or at least sufficient), it should be OK for the cache readers to frequently send (and/or increase the frequency of sending) updated information 516 on cache accesses to a cache replacement process 502. When a cache usually (or frequently) has enough space to store all objects without the need for cache replacement, it is OK to conserve communication bandwidth by infrequently (and/or decreasing the frequency of) sending information 516 on cache accesses from a cache reader 506, 508, 510, to a cache replacement process 502. On the other hand, when a cache is usually (or is frequently) full and needs to use cache replacement frequently, it is desirable for cache readers 506, 508, 510, to frequently send (and/or increase the frequency of sending) information 516 on cache accesses to the cache replacement process 502.

Thus, a system, according to one embodiment of the present invention, has the ability to operate in the following manner. When the cache is full during all or most of the time, cache readers 506, 508, 510, attempt to frequently send (and/or increase the frequency of sending) information 516 on cache accesses to the cache replacement process 502, provided at least sufficient communication bandwidth exists between the cache readers 506, 508, 510, and the cache replacement process 502. When the cache is usually not full (or frequently having space), then cache readers 506, 508, 510, less frequently attempt to send (and/or decrease the frequency of sending) information 516 on cache accesses to the cache replacement process 502. The system may increase a frequency of sending information 516 to a cache replacement process 502 in response to a cache being full more frequently. Similarly, the system may decrease a frequency of sending information 516 to a cache replacement process 502 in response to a cache being full less frequently (e.g., the cache frequently having space).

When there is limited (and/or low) communication bandwidth such as between a cache reader 506, 508, 510, and a cache replacement process 502, the system limits (and/or decreases) the amount of communication between a cache reader 506, 508, 510, and the cache replacement process 502. When communication bandwidth such as between a cache reader 506, 508, 510, and a cache replacement process 502 is plentiful (or at least sufficient), the system places fewer restrictions on (and/or increases) the amount and frequency of information 516 exchanged between a cache reader 506, 508, 510, and the cache replacement process 502. The system may place more restrictions on an amount of communication 516 between a cache reader 506, 508, 510, and a cache replacement process 502 in response to available bandwidth decreasing. Similarly, the system may place fewer restrictions on an amount of communication of information 516 between a cache reader 506, 508, 510, and a cache replacement process 502 in response to available bandwidth increasing.

When a cache reader 506, 508, 510, has limited bandwidth to communicate with a cache replacement process 502, there are multiple ways to reduce the amount of communications between the cache reader 506, 508, 510, and the cache replacement process 502. The cache reader 506, 508, 510, can send information 516 on cache accesses to the cache replacement process 502 less frequently. Alternatively, or in addition, less information 516 on cache accesses could be sent. For example, instead of sending information 516 on cache accesses to all objects, a cache reader 506, 508, 510, could only send information 516 on cache accesses for objects whose access patterns have changed significantly since a previous communication of information 516 between the cache reader 506, 508, 510, and the cache replacement process 502. Another option is to use compression to limit or reduce the size of communications of information 516 between the cache reader 506, 508, 510, and the cache replacement process 502.

Another feature of the cache replacement process 502, according to various embodiments, is the ability to make cache replacement information (e.g. information on how frequently cached objects are accessed, updated, etc) persistent so that information will still be available in the event that the cache replacement process 502 fails. This can be achieved by replicating the cache replacement information either on disk, on another node, and/or in another process. A main issue in doing this is that replicating the information stored within the cache replacement process 502 for high availability purposes or other reasons incurs overhead. According to certain embodiments of the present invention, a system uses several techniques such as discussed above for reducing this overhead.

If cache replacement information is replicated very frequently, the backup copy(s) of information will be very current, which is preferable. On the negative side, replicating information too frequently can incur overhead. In order to minimize overhead, open connections can be maintained between a cache replacement process 502 and another node which is receiving the replicated information. Multiple communications with information to be backed up can be made on a single connection.

If a cache replacement process 502 replicates information infrequently, less overhead will be incurred. On the negative side, the backup copy(s) is likely to be more outdated. Thus, frequency of replication should be selected to balance currency of backup information and overhead resulting from replicating the information.

There are multiple options for selecting a frequency with which a cache replacement process 502 replicates information to be used for a backup copy(s) including but not limited to the following.

A cache replacement process 502 replicates updated information to one or more backup copies after a certain time period has elapsed since a previous time that the cache replacement process 502 replicated information to one or more backup copies.

A cache replacement process 502 replicates updated information to one or more backup copies after a number of updates to the information, that the cache replacement process 502 has received since the last backup, exceeds a threshold.

A cache replacement process 502 can maintain information on patterns of read requests. Over time, these patterns may change. For example, object o1 might be accessed on average once every minute. At some point, object o1 might start being accessed much more frequently (e.g. once every 5 seconds). When the cache replacement process 502 becomes aware of this change, the cache replacement process 502 replicates updated information about the change in access patterns to one or more backup copies. As another example, a threshold t1 could be maintained representing a frequency of access to an object o1 (e.g. 5 accesses per minute). One or more backup copies store previous information of whether the frequency of accesses to object o1 is above or below the threshold t1. If the cache replacement process 502 determines that a frequency of access to object o1 were previously below t1 but then increases above t1, the cache replacement process 502 updates one or more backup copies with the new access frequency for object o1. Similarly, if the cache replacement process 502 determines that a frequency of access to object o1 were previously above t1 but then falls below t1, the cache replacement process 502 updates one or more backup copies with the new access frequency for object o1.

Yet another feature of certain embodiments of the present invention is the ability to dynamically tune the frequency with which the cache replacement process 502 updates back up information. When available bandwidth for communication between a cache replacement process 502 and a node, process, or other entity backing up information is low, it is preferable to limit updates to backup information sent by the cache replacement process 502. When available bandwidth for communication between the cache replacement process 502 and a node, process, or other entity backing up information is high, it should be OK for the cache replacement process 502 to frequently send updated backup information. When a cache usually has enough space to store all objects without the need for cache replacement, it is OK to conserve communication bandwidth by infrequently sending updates to backup information from the cache replacement process 502. On the other hand, when a cache is usually full and needs to use cache replacement frequently, it is desirable for the cache replacement process 502 to frequently send updates to backup information.

Thus, a system, according to various embodiments, has the ability to operate in the following manner. When the cache is full during all or most of the time, the cache replacement process 502 attempts to frequently send information to update one or more backup copies, provided sufficient communication bandwidth exists. When the cache is usually not full, then the cache replacement process 502 attempts to send information to update one or more backup copies less frequently. The system may increase a frequency of sending backup information from a cache replacement process 502 in response to a cache being full more frequently. Similarly, the system may decrease a frequency of sending backup information from a cache replacement process 502 in response to a cache being full less frequently.

When there is limited communication bandwidth between a cache replacement process 502 and a node, process, or other entity storing backup information, the system limits the amount of backup information sent by the cache replacement process 502. When communication bandwidth between a cache replacement process 502 and a node, process, or other entity storing backup information is plentiful, the system places fewer restrictions on the amount and frequency of backup information sent by the cache replacement process 502. The system may place more restrictions on an amount of backup information sent by a cache replacement process 502 in response to available bandwidth decreasing. Similarly, the system may place fewer restrictions on an amount of backup information sent by a cache replacement process 502 in response to available bandwidth increasing.

When a cache replacement process 502 has limited bandwidth to communicate with a node, process, or other entity storing backup information, there are multiple ways to reduce the amount of back up information sent by the cache replacement process 502. The cache replacement process 502 can send updated backup information less frequently. Alternatively, or in addition, less information on cache accesses could be sent. For example, instead of sending information on cache accesses to all objects, a cache replacement process 502 could only send information on cache accesses for objects whose access patterns have changed significantly since a previous update of backup information. Another option is to use compression to limit reduce the size of communications between the cache replacement process 502 and a node, process, or other entity storing backup information.

The system may use multiple algorithms for determining which objects to retain in the cache. These include, but are not limited, to the following.

LRU, or least recently used: When the cache has become full and an object needs to be dropped from the cache, remove the object which was last accessed farther back in time than any other object. For example, suppose that there is an object o1 in the cache which was last accessed seven hours ago. All other cached objects have been accessed more recently. It is desirable to store an object o2 in the cache. However, the cache does not have enough space for object o2. The cache replacement process can make a decision to remove object o1 from the cache in order to make space for object o2.

LRU-K (where K is a positive integer): When the cache has become full and an object needs to be removed from the cache, remove the object whose Kth most recent access is farther back in time than any other object. LRU-1, according to the present example, would be the standard least recently used algorithm. LRU-5 would mean the system would examine the times of the $5^{th}$ most recent access for cached objects. The object whose $5^{th}$ most recent access is farthest back in time would be removed from the cache.

GreedyDual-Size: This algorithm has been shown to outperform LRU for Web workloads as well as certain other workloads. It is described in "Cost-Aware WWW Proxy Caching Algorithms", Cao, Irani, Proceedings of USITS '97, http://static.usenix.org/publications/library/proceedings/usits97/full_papers/cao/cao.pdf A quantitative utility value can be assigned to each cached object which represents the value of caching each object. The cache system attempts to maintain objects with the highest utility values. The object selected for removal from the cache is generally one with a lowest (or one of the lowest) utility value. For example, suppose that an object o1 in the cache has the lowest utility value of all cached objects. It is desirable to store a new object o2 in the cache. However, the cache does not have enough space for the new object o2. The cache replacement process 502 can make a decision to remove object o1 (having the lowest utility value of all cached objects) from the cache in order to make space for the new object o2.

In general, more frequently requested objects are more desirable to store in the cache than less frequently requested objects. In some cases, it is preferable to store in the cache the smaller objects because they take up less cache memory space than the larger objects. Some cache objects are more expensive to materialize at the source than other objects. It is generally preferable to cache objects which are more expensive to materialize than objects which are less expensive to materialize because caching the more expensive objects will result in a greater reduction in resources for materializing objects from the source. If objects have different lifetimes, then it may be preferable to cache objects with longer lifetimes because they will be valid in the cache for a longer time.

The quantitative utility value approach discussed above can be used to quantitatively weight objects, such as based on any one or more of the following: object access frequencies, object sizes, overhead to materialize each of the objects, and object lifetimes, in determining utility values for the individual objects. Variants of the GreedyDual-Size algorithm can also take these four parameters into consideration for making cache replacement decisions.

The techniques described above can also be used for prefetching objects into a cache before the objects are actually requested.

Operating Environment

Figure 6:
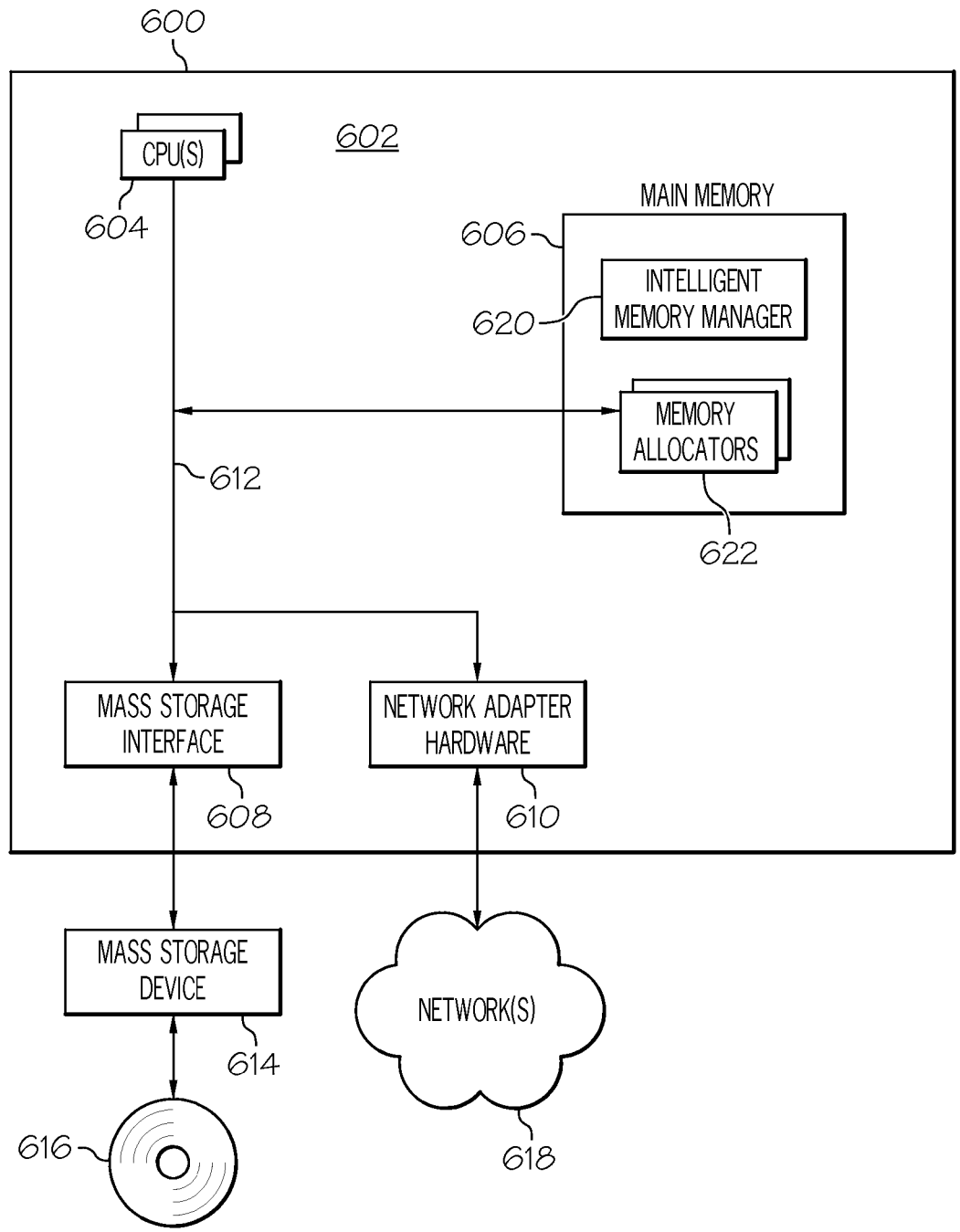
FIG. 6 is a block diagram showing an example operating environment for various embodiments of the present invention.

FIG. 6 shows an example operating environment applicable to various embodiments of the present invention. In particular, FIG. 6 shows an information processing system 600 that is based upon a suitably configured processing system adapted to implement one or more embodiments of the present invention. Similarly, any suitably configured processing system can be used as the information processing system 600 by various embodiments of the present invention. The system 600 can be a standalone system or reside within a multi-system environment such as a parallel-distributing environment.

The information processing system 600, according to the present example, includes a computer 602. The computer 602 has at least one processor(s) 604 that is communicatively coupled with a main memory 606, a mass storage interface 608, and network adapter hardware 610. According to one embodiment, a system bus 612 interconnects these system components. According to various embodiments, the main memory 606 comprises at least one shared memory that can be contemporaneously accessed by one or more processes running on the at least one processor(s) 604. The shared memory, in accordance with various embodiments of the present invention, comprises at least one cache memory. That is, at least one cache can be maintained as a shared cache memory.

The main memory 606, in one embodiment, comprises an intelligent memory manager (IMM) 620 and one or more memory allocators 622, which are discussed in greater detail below. Although illustrated as concurrently resident in the main memory 606, it is clear that respective components of the main memory 606 are not required to be completely resident in the main memory 306 at all times or even at the same time. In one embodiment, the information processing system 600 utilizes conventional virtual addressing mechanisms to allow programs to behave as if they have access to a large, single storage entity, referred to herein as a computer system memory, instead of access to multiple, smaller storage entities such as the main memory 606 and mass storage device 614. Note that the term "computer system memory" is used herein to generically refer to the entire virtual memory of the information processing system 600.

The mass storage interface 610 is used to connect mass storage devices, such as mass storage device 616, to the information processing system 600. One specific type of data storage device is an optical drive such as a CD/DVD drive, which may be used to store data to and read data from a computer readable medium or storage product such as (but not limited to) a CD/DVD 616. Another type of data storage device is a data storage device configured to support, for example, NTFS type file system operations.

Although only one CPU 604 is illustrated for computer 602, computer systems with multiple CPUs (e.g., multiple processors) can be used equally effectively. Various embodiments of the present invention further incorporate interfaces that each includes separate, fully programmed microprocessors that are used to off-load processing from the CPU 604. An operating system (not shown) included in the main memory is a suitable multitasking operating system such as any of the Linux, UNIX, Windows, and Windows Server based operating systems. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 600. The network adapter hardware 610 is used to provide an interface to a network 618. Various embodiments of the present invention are able to be adapted to work with any data communications connections including present day analog and/or digital techniques or via a future networking mechanism.

Various embodiments of the present invention provide customized memory allocation that can be tailored to individual applications via the IMM 620. The IMM 620 provides a variety of memory allocation configurations including, but not limited to, first fit, best fit, multiple free list fit I, multiple free list fit II, quick fit, and buddy systems. See, for example, "Scalability of Dynamic Storage Allocation Algorithms", Arun Iyengar, Proceedings of Frontiers '96, herein incorporated by reference in its entirety. Therefore, if an application has very specific memory allocation requirements, the IMM 620 can handle it efficiently.

Figure 7:
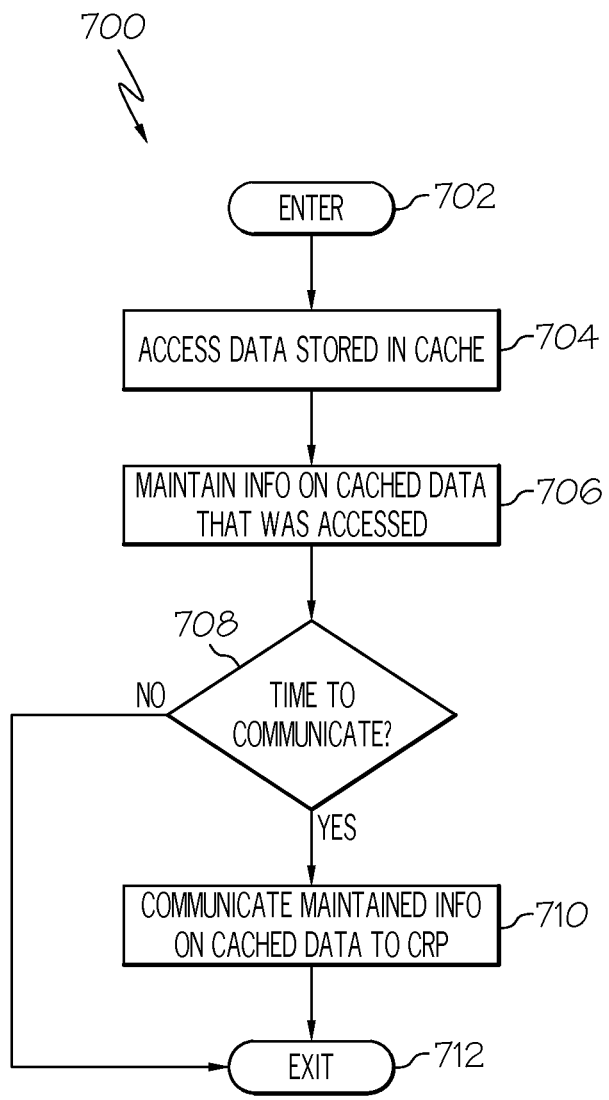
FIGS. 7 and 8 are flow diagrams illustrating example of operations for a cache memory management system according to one embodiment of the present invention.
Figure 8:
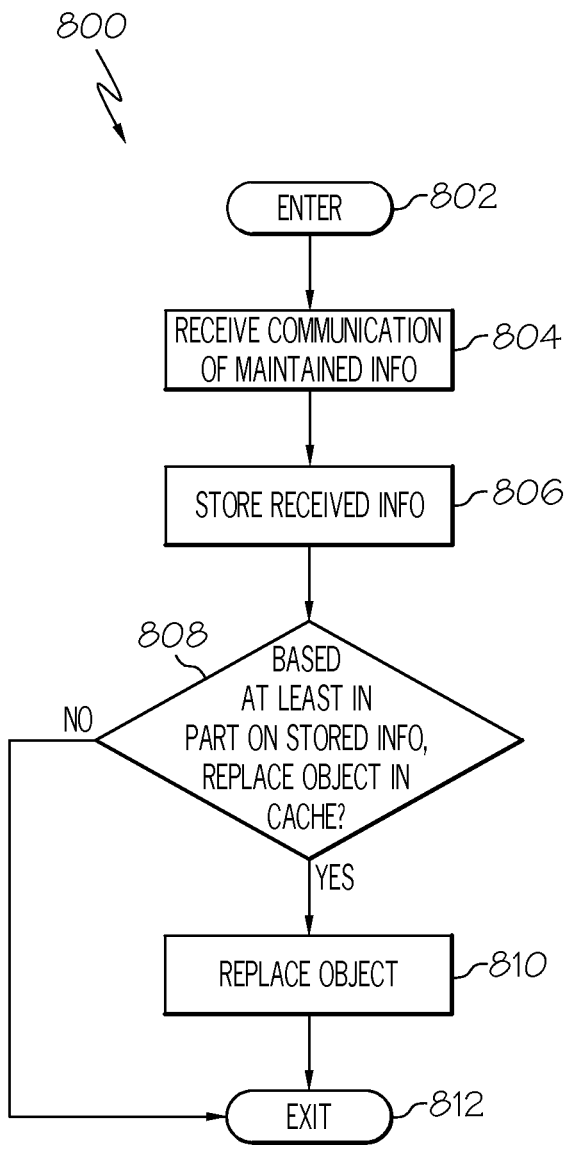

FIGS. 7 and 8 are flow diagrams 700, 800, illustrating a non-limiting example of operations for a cache memory management system 500 such as shown in FIG. 5. The flow diagram 700 of FIG. 7 can be followed by a cache reader 506, 508, 510, or by a cache writer 504, while accessing one or more objects in the shared memory 102 of the cache 500. The flow diagram 800 of FIG. 8 is followed by a cache replacement process (CRP) 502, such as shown in FIG. 5. With reference to both FIGS. 7 and 8, and as has been already discussed above with reference to FIG. 5, the cache readers 506, 508, 510, and the cache writer 504, can access (e.g., read information from), at steps 702 and 704, one or more data objects in the shared cache memory 102. Additionally, the cache writer 504 can access the one or more data objects in the shared cache memory 102 by writing data to the respective one or more data objects.

Contemporaneously with accessing the data objects, at steps 702 and 704, each of the cache readers 506, 508, 510, and the cache writer 504, maintains, at step 706, access related information on the cached data object(s) that it has accessed. For example, each of the cache readers 506, 508, 510, and the cache writer 504, can keep track of cached object access statistics for the object(s) in the cache 500 that the particular cache reader or cache writer has accessed. Each of the cache readers 506, 508, 510, and the cache writer 504, periodically and/or continuously (e.g., generally based on a timing event) or at the occurrence of certain other event(s), determines, at step 708, whether it is time to communicate maintained information to the cache replacement process 502. While the determination, at step 708, continues to be negative, the flow then exits, at step 712. However, if the determination, at step 708, is positive, then the particular cache reader 506, 508, 510, or the cache writer 504, communicates, at step 710, the maintained information to the cache replacement process 502. The flow then exits, at step 710. Various examples of timing events or occurrences of certain other events that trigger a communication of maintained information to the cache replacement process 502 have already been discussed above, and will not be repeated here.

With reference to FIG. 8, the cache replacement process 502, at steps 802 and 804, receives communication of the maintained information from the respective cache reader 506, 508, 510, or the cache writer 504, that communicated the information. The cache replacement process, at step 806, stores the received information. It should be noted that, as has already been discussed above, the received information (from one of the cache readers 506, 508, 510, or the cache writer 504) could be stored as received and/or it may be stored and aggregated with other information that is stored and maintained by the cache replacement process 502. According to various embodiments of the present invention, the cache replacement process 502 can maintain statistics that unify a view of overall cache replacement statistics and performance to make cache replacement decisions for the cache 500. That is, for example, the cache replacement process 502 can maintain unified statistics on accesses to cached objects by the cache readers 506, 508, 510, and/or by the cache writer 504. The cache replacement process 502 uses the statistics it has collected on accesses to cached objects to make decisions on which objects to keep in the shared memory cache 102 when the shared memory cache 102 becomes full and does not have sufficient space to store all objects. The cache replacement process 502 may also use these statistics to prefetch objects into the shared memory cache 102 before the objects are accessed by any of the cache readers 506, 508, 510, or by the cache writer 504. Continuing with FIG. 8, based at least in part on the stored information, the cache replacement process 502, at step 808, determines whether to replace one or more objects in the cache 500. The cache replacement process will generally not replace objects in the cache if the cache has sufficient space to store all of the objects without excluding other objects from the cache whose inclusion in the cache could potentially improve performance. If the determination, at step 808, is negative then the flow exits, at step 812. If, however, the determination is positive, at step 808, the cache replacement process 502 then, at step 810, replaces the one or more objects in the cache 500, and then the flow exits, at step 812.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program storage product for managing objects stored in cache memory that is communicatively coupled with at least one processor, and in which multiple processes at least read data from the cache memory, the computer program storage product comprising a non-transitory computer readable storage medium comprising instructions configured to perform a method comprising:
   reading, with at least one first process, data stored in the cache memory;
   maintaining, with the at least one first process, information on cached data that has been requested by at least one client;
   receiving, by at least one second process, communications from the at least one first process;
   communicating, from the at least one first process, at least part of the maintained information to the at least one second process; and
   using, by the at least one second process, at least part of the maintained information from the at least one first process to make at least one decision on replacing at least one object currently stored in the cache memory, wherein replacing an object comprises removing the object from the cache in order to store another object, and wherein the at least one first process communicating at least part of the maintained information to the at least one second process is performed in response to a time period having elapsed since a previous time that the at least one first process communicated at least part of the maintained information to the at least one second process.

2. The computer program storage product of claim 1, the cache memory communicatively coupled with the at least one processor being further comprised of multiple cache readers independently reading cached data residing in shared cache memory, and a single cache writer updating cached data in the shared cache memory, wherein the at least one first process comprises a cache reader and the at least one second process resides on the cache writer.

3. The computer program storage product of claim 1, wherein the at least part of the maintained information includes information on how frequently at least one cached object is accessed.

4. The computer program storage product of claim 1, wherein the at least one decision on what objects should be stored in the cache memory is made using at least one of:
   LRU (Least Recently Used);
   LRU-K (where K is a positive integer);
   GreedyDual-Size; and
   a quantitative utility metric assigned to cached objects.

5. The computer program storage product of claim 1, wherein the at least one first process communicating at least part of the maintained information to the at least one second process is performed in response to a change in an access pattern of at least one cached object since a previous time that the at least one first process communicated at least part of the maintained information to the at least one second process.

6. The computer program storage product of claim 5, wherein the change in an access pattern comprises an access frequency for a cached object falling below a threshold.

7. The computer program storage product of claim 5, wherein the change in an access pattern comprises an access frequency for a cached object exceeding a threshold.

8. A computer program storage product for managing objects stored in cache memory that is communicatively coupled with at least one processor, and in which multiple processes at least read data from the cache memory, the computer program storage product comprising a non-transitory computer readable storage medium comprising instructions configured to perform a method comprising:
   reading, with at least one first process, data stored in the cache memory;
   maintaining, with the at least one first process, information on cached data that has been requested by at least one client;
   receiving, by at least one second process, communications from the at least one first process;
   communicating, from the at least one first process, at least part of the maintained information to the at least one second process; and
   using, by the at least one second process, at least part of the maintained information from the at least one first process to make at least one decision on replacing at least one object currently stored in the cache memory, wherein replacing an object comprises removing the object from the cache in order to store another object, and wherein a frequency of the at least one first process communicating at least part of the maintained information to the at least one second process is at least one of
   decreased in response to the cache frequently having space, and
   increased in response to the cache frequently being full.

9. The computer program storage product of claim 8, wherein the cache memory communicatively coupled with the at least one processor being further comprised of multiple cache readers independently reading cached data residing in shared cache memory, and a single cache writer updating cached data in the shared cache memory, wherein the at least one first process comprises a cache reader and the at least one second process resides on the cache writer.

10. The computer program storage product of claim 8, wherein the at least part of the maintained information includes information on how frequently at least one cached object is accessed.

11. The computer program storage product of claim 8, wherein the at least one decision on what objects should be stored in the cache memory is made using at least one of:
    LRU (Least Recently Used);
    LRU-K (where K is a positive integer);
    GreedyDual-Size; and
    a quantitative utility metric assigned to cached objects.

12. The computer program storage product of claim 8, wherein the at least one first process communicating at least part of the maintained information to the at least one second process is performed in response to a change in an access pattern of at least one cached object since a previous time that the at least one first process communicated at least part of the maintained information to the at least one second process.

13. The computer program storage product of claim 12, wherein the change in an access pattern comprises an access frequency for a cached object falling below a threshold.

14. The computer program storage product of claim 12, wherein the change in an access pattern comprises an access frequency for a cached object exceeding a threshold.

15. A computer program storage product for managing objects stored in cache memory that is communicatively coupled with at least one processor, and in which multiple processes at least read data from the cache memory, the computer program storage product comprising a non-transitory computer readable storage medium comprising instructions configured to perform a method comprising:
    reading, with at least one first process, data stored in the cache memory;
    maintaining, with the at least one first process, information on cached data that has been requested by at least one client;
    receiving, by at least one second process, communications from the at least one first process;
    communicating, from the at least one first process, at least part of the maintained information to the at least one second process; and
    using, by the at least one second process, at least part of the maintained information from the at least one first process to make at least one decision on replacing at least one object currently stored in the cache memory, wherein replacing an object comprises removing the object from the cache in order to store another object, and wherein
    the method further comprising the at least one second process periodically replicating information used to make cache replacement decisions to another node or process that provides higher availability of the replicated information.

16. The computer program storage product of claim 15, wherein the replicating information is performed in response to a time period having elapsed since a previous time that the at least one second process replicated information used to make cache replacement decisions to another node or process.

17. The computer program storage product of claim 15, wherein the replicating information is performed in response to the at least one second process receiving a number of updates to the information since a previous time that the at least one second process replicated information used to make cache replacement decisions to another node or process.

18. The computer program storage product of claim 15, wherein the replicating information is performed in response to the at least one second process detecting a change in an access pattern of at least one cached object since a previous time that the at least one second process replicated information used to make cache replacement decisions to another node or process.

19. The computer program storage product of claim 18, wherein said change in an access pattern comprises at least one of an access frequency for a cached object falling below a threshold and an access frequency for a cached object exceeding a threshold.

20. The computer program storage product of claim 15, wherein a frequency of the replicating information is at least one of decreased in response to the cache frequently having space and increased in response to the cache frequently being full.

21. The computer program storage product of claim 15, wherein a frequency of the replicating information is at least one of decreased in response to limited communication bandwidth and increased in response to sufficient communication bandwidth.

22. The computer program storage product of claim 15, wherein the at least one first process communicating at least part of the maintained information to the at least one second process is performed periodically.

* * * * *